March 9, 1948.  F. A. QUIROZ  2,437,552
VALVE CONSTRUCTION
Filed Feb. 2, 1944  2 Sheets-Sheet 2
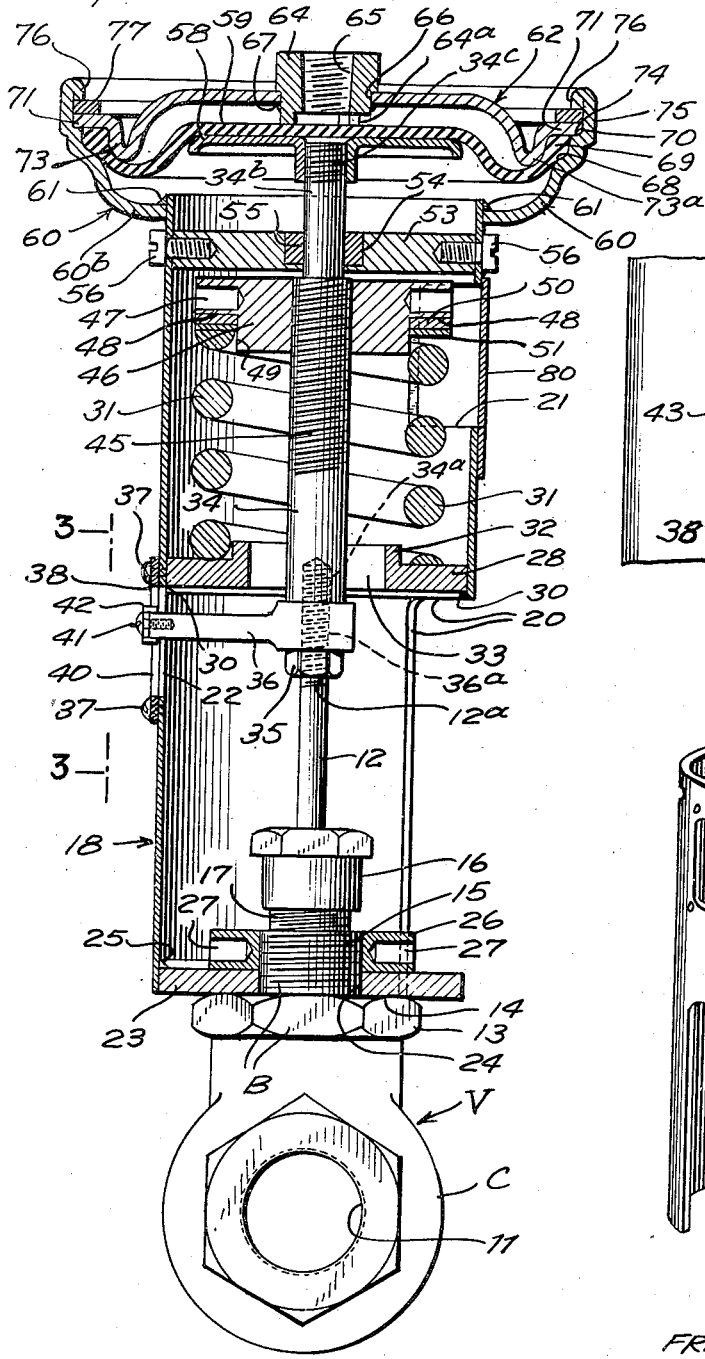
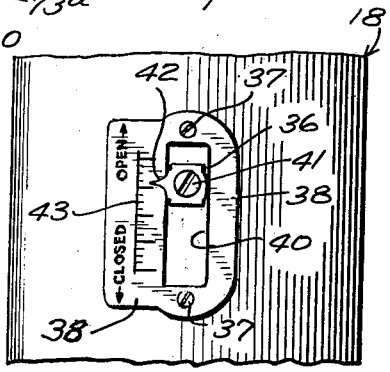
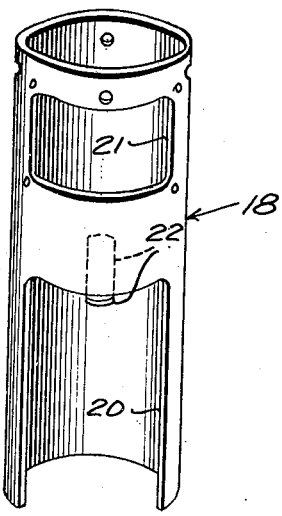
INVENTOR.
FRANCISCO A. QUIROZ
BY
William T. Kniesner
ATTORNEY Patented Mar. 9, 1948

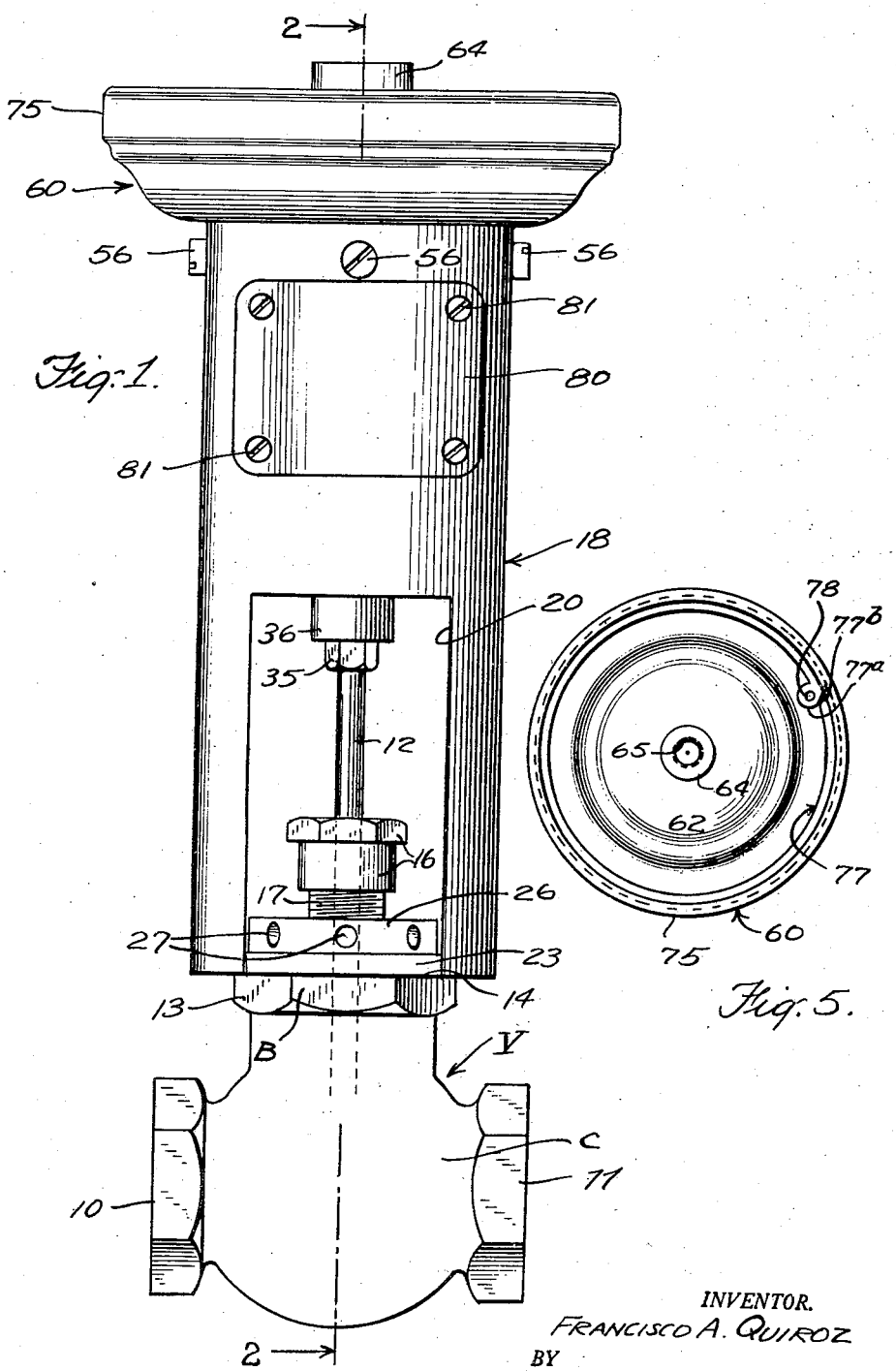

2,437,552

UNITED STATES PATENT OFFICE 2,437,552

VALVE CONSTRUCTION

Francisco A. Quiroz, Newark, N. J., assignor to Kieley & Mueller, Inc., North Bergen, N. J., a corporation of New York Application February 2, 1944, Serial No. 520,753

7 Claims. (Cl. 137—153)

1

This invention relates to valve construction and more particularly to the construction of valves of the type employing a fluid-actuated diaphragm for actuating or controlling a valve member.

One of the objects of this invention is to simplify and make less expensive and less cumbersome a valve construction of the above-mentioned type. Another object is to provide a valve construction of the above-mentioned character which will be of light weight, yet strong and durable, and of long-lasting, efficient and reliable action. Another object is to provide, in a valve construction of the above-mentioned nature, individual parts which are easy and less expensive to fabricate and which are capable of ease and low cost assembly to build up the structure in sub-assemblies or sub-units which in turn are capable of facile and inexpensive assembly to complete the entire valve unit. Another object is to provide a construction of the above-mentioned character that will be capable of fabrication by fewer machine tool or machining operations, and yet provide an easy-to-assemble, strong and light-weight structure. Another object is to provide a light-weight, compact, strong and reliably-acting valve actuating sub-unit that will be capable of speedy yet simple and reliable attachment or assemblage to the valve element to be actuated. Another object is in general to provide an improved valve unit of the spring-opposed-diaphragm type, to simplify the construction and mountings and assemblage of the various parts thereof, to provide for long-lasting ease of actuation, and to provide for ease of setting or adjustability and ease of access to its various parts. Other objects will be in part obvious or in part pointed out hereinafter.

The invention accordingly consists in the features of construction, combinations of elements, and arrangements of parts all as will be exemplified in the structure to be hereinafter described and the scope of the application of which will be indicated in the following claims.

In the accompanying drawings, in which is shown one of the various possible embodiments of my invention, Figure 1 is a front elevation of the complete and assembled valve construction;

Figure 2 is a central vertical sectional view as seen along the line 2—2 of Figure 1, certain parts, however, being shown in elevation;

Figure 3 is a fragmentary elevation as seen along line 3—3 of Figure 2;

Figure 4 is a perspective view of a casing or

2 frame member forming part of the valve structure of Figures 1, 2 and 3; and

Figure 5 is a plan view, on a smaller scale, as seen from above in Figure 1.

Similar reference characters refer to similar parts throughout the several views of the drawings.

As conducive to a clearer understanding of certain features of the invention, let it be assumed that a valve, generally indicated by the reference character V, is to have its valve element controlled, varied or set by or under the control of a suitable fluid under pressure of which compressed air or steam under pressure may be illustrative. The valve V has a casing C of any suitable construction, being usually provided with an inlet and an outlet, suitably threaded or otherwise constructed for making pipe connections thereto, as indicated at 10 and 11, thus to permit the valve V to be connected into the pipe line in which it is to control the flow, pressure, or the like. Internally, the valve V may be of any desired construction and hence no specific form of internal valve arrangement is shown in the drawings, excepting that a valve stem 12 extends out through the casing C of the valve, being internally connected to the valve element (not shown) so that the latter may be actuated by way of the valve stem 12 from the exterior of the casing C. This internal valve mechanism furthermore may be constructed, in known manner, to effect valve closing action upon downward movement of the valve stem 12, as viewed in Figures 1 and 2, or to effect valve opening upon such downward movement, according to the purpose that the valve V is to function in the system in which it is included. The valve stem 12, therefore, is to be actuated by the above-mentioned fluid under pressure.

The valve stem 12 passes out of the casing C through a suitable extension of the latter terminating in a bonnet B that provides a heavy annular flange 13 which may be externally polygonal to facilitate application thereto of an ordinary wrench, the upper annular face 14 of the flange 13 being faced off at right angles to the axis of the bonnet B, thus to provide a good plane face for purposes later described.

Coaxial with the annular flange 13 and projecting beyond the face 14 is a threaded tubular element 15 which may be integrally formed as part of the valve casing C or which may be in the form of a threaded bushing threaded into bonnet flange 13 which for that purpose is internally threaded, and the element 15 is threaded both externally and internally. The valve stem 12 passes coaxially through the element 15 and a seal may be provided to avoid leakage from within the valve casing C, past the valve stem 12; such a seal may take any desired or known form of construction but preferably comprises a stuffing box type of seal, generally indicated by the reference character 16, being provided with a threaded downward extension 17 to thread it into the internally threaded element 15 and containing any suitable packing material which may be compressed against and around the moveable valve stem 12 in any known or desired manner.

To a casing and valve stem like those above described is to be assembled a valve control or operating mechanism or structure, and for the latter I provide a main casing-like frame element, generally indicated by the reference character 18, which I make up out of a suitable length of relatively thin-walled and hence light-weight tubing of any suitable metal, such as brass, steel or the like, illustratively and preferably of steel, selecting a diameter of tubing which can be on the order of the maximum diameter of the casing C itself. In Figure 4, I have shown in perspective a length of such tubing converted to form the tubular frame element 18 above mentioned; the desired length of tube is easily cut from the long lengths in which the tubing is fabricated and at one side and near its lower end I provide a cut-out 20 of substantial dimensions but of a length in a circumferential direction preferably relatively small so as to avoid diminishing the high rigidity and stiffness per unit weight which the thin-walled tubular element possesses. Materially above the cut-out 20, I cut out a generally rectangular hole 21 and on the opposite side and with its upper edge substantially aligned with the upper edge of the cut-out 20 I provide a small rectangular hole 22, all for purposes later described. These cut-outs or holes 20, 21 and 22 may be easily and quickly made as by the use of a cutting torch, the resultant tubular frame element being light in weight yet very strong, also resistant to torsion effects, and capable of ease of assembly thereto of other parts, according to other features of my invention.

Next I provide a base plate 23 (Figures 1 and 2) which is preferably relatively heavy and may be stamped or turned to give it an external diameter matching the internal diameter of the tubular frame 18 and to give it a central hole 24 which snugly fits over the upwardly projecting element 15 of the valve casing C to which, if desired, it may be threaded by making the hole 24 of lesser diameter and threading it. The disk-like base plate 23 is fitted into the lower end of the tubular frame 18, becoming thereby coaxial with it, and is secured thereto in any suitable way, preferably as by welding as indicated at 25, thus further strengthening and stiffening the frame structure. With the other parts assembled thereto, and with the base plate fitted into the casing C as above described, a capstan type of nut 26, provided with holes 27 to receive a suitable tool, such as a spanner wrench or an appropriate bar or rod, is threaded into the externally threaded element 15 and tightened to clamp the base plate 23 tightly against the finished face 14 of the bonnet flange 13, and thus the tubular casing structure 18 is assembled to the valve casing C with its axis brought neatly into coincidence with the axis of the valve stem 12.

Such assemblage may be effected prior to assembling the stuffing box 16 where the external dimensions of the latter are greater than the diameters of the hole 24 of the base plate 23 and of the hole in the capstan nut 26.

The cut-out 20 extends about half-way from the lower edge of the tubular frame 18 and just above the upper horizontal edge of the cut-out 20 and just above the upper edge of the hole 22, so as to engage the tube frame 18 throughout its entire circumference, there is received within the tube frame 18 an annulus or collar 28 secured to the tube frame 18 in any suitable way, preferably by welding as at 30, and here it may be noted that this welding, as well as the welding 25 about the base plate 23, can be readily effected by the access provided by the cut-out 20, and preferably the annulus 28 is assembled to the tube frame 18 prior to the assemblage thereto of the base plate 23. The collar or annulus 28 reinforces and strengthens the tube frame 18 and it forms the lower abutment for a helical spring 31 having its lower end turn suitably ground off to rest flatwise against the upper face of the annulus 28 which is provided with an upstanding annular flange 32 of a diameter somewhat less than the internal diameter of spring 31 so as to keep the lower end of the spring 31 coaxial with the structure.

The annulus 28 has a relatively large central hole 33 through which freely passes a diaphragm stem or rod 34 provided at its lower end with means for making easy and detachable connection with the valve stem 12 and for mounting certain other parts. Thus the upper end of valve stem 12 is externally threaded as at 12ª throughout a substantial extent, carrying a nut 35, and the lower end of stem 34 is drilled out and threaded as at 34ª so that it may be threaded onto the upper threaded portion 12ª of the valve stem 12. The pointer arm 36, of a length sufficient to project through the hole 22, has at its inner end a hole 36ª so that it may be received onto the valve stem 12 and between the nut 35 of the diaphragm stem 34. The pointer arm 36 may thus be clamped in position between the parts 34 and 35, both of which are threaded on the valve stem 12 or if desired the hole 36ª may also be threaded and the pointer arm 36 hence also threaded onto the valve stem 12, and the three parts may thus function as lock nuts mutually locking each other against loosening up. The pointer arm 36 projects through the hole 22 in the casing 18, the hole being vertically elongated and hence more in the nature of a slot, being sufficiently wider than the thickness of the arm 36 to permit ease of vertical movement without too much lateral play and hence the pointer arm 36 can function to hold the stem assemblage 12—34 against rotational movement particularly when certain adjustments later described are effected.

Overlying the exterior of the tube casing 18 and secured thereto as by screws 37 (Figures 2 and 3) is a plate 38 having therein a slot or opening 40 which mates with the slot or hole 22 or accurately defines the sides of the latter where hole 22 is irregularly cut out or is not finished off, to permit the outermost end of pointer arm 36 to project through and beyond the plate 38; secured, as by screw 41, to the outer end of pointer arm 36 is a plate-like stamping shaped to provide a pointer 42 to indicate the vertical position of the stem assemblage 12—34 and hence the indicate the position of the valve element in the valve V, all with reference to suitable indicia 43 (Figure 3) stamped or provided on the plate 38 and, if desired, bearing legends "open"

and "closed" at the respective extreme ends of the graduations 43. Depending upon the valve structure inside the casing C, as earlier above mentioned, the valve closes on upward movement of the stem 12 or according to circumstances opens on upward movement of the valve stem 12. For either of these conditions, the plate 38 is applicable in that it need only be turned upside down to suit the particular internal valve arrangement, thus reversing the "open" and "closed" legends end for end.

A suitable extent of the stem 34 is threaded as at 45 (Figure 2) to receive a capstan type of nut 46 provided with suitably spaced holes 47 to receive the operating tool and provided with a downwardly exposed annular face 48 surrounding a shoulder 49 of substantial axial extent, thus to receive against the face 48 and to be centered by the shoulder 49 an annular washer-like member 50 made of any suitable bearing and preferably self-lubricating material, such as graphite, and underlying the bearing member 50 is a metal washer 51 to form a metallic seat about the spring-centering shoulder 49 for the upper end of the spring 31 which is at its endmost turn suitably ground off and thus flattened for good engagement with the metal washer 51.

In assembling, and with the diaphragm stem 34 connected to the valve stem 12 as above described, the spring 31 is set down into the upper still-open end of the tube casing 18 and brought to rest upon the annulus 28, and then the capstan nut 46 with bearing element 50 and seat element 51 are brought down into the still-open end of the tube frame casing and the nut 46 started onto the threads 45 of the diaphragm stem 34, whence the threading of the nut 46 downwardly may be continued by applying a suitable tool to the capstan holes 47 through the hole 21 in the tube casing 18, thus to bring the nut down far enough to permit the insertion into the upper open end of the tube frame 18 of a disk-like top plate 53 which is snugly received within the tube and which is counterbored as at 54 to provide a seat for holding bearing bushing 55 made of any suitable bearing material, such as graphite, and received over the smaller-diametered end portion 34$^b$ of the diaphragm stem 34, whence the top plate 53 is secured in position by a suitable number of suitably peripherally distributed screws 56 which pass through holes in the tube casing 18 and are threaded into threaded holes provided in the top plate 53. Thus there is provided a bearing for the upper end of the stem assemblage 12—34 which is coaxial with the tube frame 18 and also with the bearing provided at the lower end, as in the stuffing box 16, for the valve stem 12, or such other bearing means in casing C.

The upper end of the stem extension 34$^b$ has secured to it a disk element 58 of substantial diameter to form a large area of engagement with a flexible diaphragm 59 and to receive from the latter the force of the fluid pressure applied to the diaphragm 59 for moving the stem assemblage 34—12 downwardly against the action of the spring 31, as is later described. The disk member 58 may be rigidly secured to the upper end of the diaphragm stem 34$^b$ in any suitable manner and preferably the latter is threaded as at 34$^c$ to receive the threaded hub-like portion of disk member 58. The latter may be a casting drilled and threaded or it may be a stamping of suitably heavy sheet metal, drawn to provide the hub portion thereof which is then internally threaded and given greater stiffness and rigidity as by peripherally flanging it downwardly as indicated.

The diaphragm 59 is a disk of any suitable flexible material, such as rubber, and with the underlying pressure-transmitting disk or plate member 58, the diaphragm 59 need not be anchored to the movable stem; hence it need not be holed and possibly weakened, to receive a bolt and nut or the like. Its peripheral portions coact with two members that are preferably sheet metal stampings 60 and 62, and related parts. The member 60 may be spun or drawn to give it convexities and concavities in cross-section for greater rigidity and stiffness and also to form a concave annular seat 68 against which the outer thickened annular portion 69 of the rubber diaphragm 59 may be brought to rest, member 60 being welded to the tubular frame 18 as at 61.

The curved seat 68 terminates in a cylindrical wall 70 in which is snugly and telescopically received the outer flattened annular portion 71 of the cap-like casing member 62 which has a pipe-connecting bushing 64 welded thereto. Diaphragm 59 overlies the disk element 58 attached to the stem 34 as above described, and the cap member 62 is stamped, drawn or spun to provide a downwardly and outwardly curved clamping portion 73 for clamping and pressing the diaphragm portion 59 against the seat 68, thus to cause the parts 62 and 59 to form a fluid-tight fluid-pressure chamber.

Just above the internal cylindrical wall 70, the member 60 is stepped outwardly to provide a shoulder 74 peripherally bounded by an upstanding flange portion 75 which is spun or turned over as at 76 to provide a downwardly exposed edge face spaced from the shoulder 74 by a fixed distance and within the space is received a split ring or snap ring 77 which may be and preferably is provided at one of its ends, as shown in Figure 5, with an inwardly directed projecting portion 77$^a$ having therein a hole 78 to receive a tool for facilitating manipulation of the ring 77.

With the diaphragm 59 set onto the disk member 58 and its peripheral portion 69 resting against the clamping portion or seat 68, a cap member 62 is superimposed and brought down into the cylindrical space defined by the wall 70. The cap member is then pressed downward by any suitable means to compress and clamp the diaphragm bead portion 69 and to bring the annular peripheral portion 71 of member 62 somewhat below the shoulder 74, whence the split ring 77, split at an angle to its radius as shown at 77$^b$ in Figure 5, is applied, the split ring being sprung inwardly to reduce its diameter for purposes of getting it by the flange part 76, whence it expands into the annular recess formed between the parts 76 and 84, seating itself securely against the inside face of the outer flange 70, but leaving the part 77$^a$ with its hole 78 exposed inwardly, as seen in Figure 5, to be thus accessible for subsequent manipulation to remove the split ring 77 for purposes, for example, of replacing the diaphragm 59.

The member 62 thus becomes dependably locked against removal and holds the diaphragm peripheral portion 69 compressed, insuring permanency of sealed connection against leakage of fluid under pressure supplied to the chamber. Structurally, the outwardly and upwardly flaring reinforcing part 60 thus also becomes strengthened and reinforced by the member 62, and the two together coact to resist distortion of, and to strengthen, the tube frame 18.

It is to the interior of the sealed chamber formed by the stamping 62 and the diaphragm 59 that the above-mentioned fluid under pressure is supplied by a suitable connection; such connection preferably comprises a bushing 64, internally threaded as at 65 to receive a pipe, and fitted into a hole 66, which may also be punched or stamped, in the member 62 to which it is welded and sealed as at 67.

The annular bead 73, shaped substantially as shown in Figure 2, not only adds to the above-mentioned strengthening and stiffening action, but forms a downwardly exposed convex seat 73ᵃ against which the diaphragm is progressively more and more engaged as its central portion moves upwardly, as by the action of the member 58. Upon either upward or downward movement of the central portions of the diaphragm 62, the tendency to pull radially inwardly on the peripheral outwardly-tapered bead or peripheral portion 69 of the diaphragm operates to increase the tightness of seal, for the space between the seat 73ᵃ on the bead 73 and the seat 68 (Figure 2) is narrower than the thickness of the bead-like or thickened portion 69 of the diaphragm 59, that thickened part being by such tendency or actual movement radially inwardly simply wedged tighter and tighter into or toward the narrowest portions of the progressively narrowing annular space provided between the members 60 and 62 for receiving the thickened or beaded portion 69. With such relationship of the parts, the action is to increase the sealing effect with increase in tension or force applied to the diaphragm, and hence also the locking ring 77 can simply transmit to the abutment flange 76 the reaction against any resultant tendency of the tapered diaphragm bead 69 to wedge the parts 62 and 60 apart from each other. Thus the chamber 62—59 can be maintained fluid-tight in a dependable manner.

With the assembly completed, the valve control mechanism may be set for any one of various desired conditions of operation as by setting the compression of the spring 31; that is achieved, as will now be clear, by actuating the capstan nut 46 by means of a suitable tool, such as a bar or rod inserted successively into appropriate holes 47, and operating the tool through the opening 21 in the tube casing 18. Hole 21 is of sufficient circumferential extent and the capstan holes sufficiently numerous to permit giving the nut 46 a suitable rotary swing before the tool has to be removed from one hole 47 of the capstan nut and set into a succeeding hole if further rotary adjustment is needed. It will be noted (Figure 2) that the vertical extent of the hole 21 is substantial enough to permit operation of the nut 46 throughout and within a substantial range of vertical positions of the nut 46 relative to the threaded part 45 of the diaphragm stem 34. During the rotary movement of the nut, the stem 34—12 is held against rotation by the pointer arm 36 coacting with the walls of slot 40 or slot 22 or both; the latter are long enough to accommodate the up-and-down movement of the pointer arm that accompanies the vertical movement of the valve stem 12 during operation.

The hole 21 is covered over by a cover plate 80 curved to match the curvature of the tube casing 18 and detachably secured as by screws 81 so as to give ready access to the nut 46 for adjustment. The cover plate 80 can function as a name plate.

According to the setting of the spring 31, therefore, the stem assembly 34—12 and hence the valve mechanism inside the casing C are actuated in one direction or the other according as the fluid pressure applied to the chamber 62—59 overcomes the force of the spring 31 upon increase in pressure or is overcome by the force of spring 31 upon decrease in fluid pressure, thus effecting corresponding actuation of the valve within the casing C. The resultant up-and-down movements of the stem assembly 34—12 can take place with ease and nicety, the long-lasting self-lubricating bearing bushing 55 at the upper end of the stem 34 forming a guiding and supporting bearing which, by the structural features and features of assembly, will now be seen to be positioned and dependably held coaxially with the valve stem 12 and the bearing or bearings which the stem 12 has in the stuffing box 16 or within the valve casing C, and up-and-down movements of the stem assembly thus taking place without binding. Each of such movements is, furthermore, not interfered with by the tortional effects that might otherwise be imposed by the spring 31 as it undergoes expansion and contraction, for the self-lubricating or low-friction bearing annulus 48 permits freedom and ease of rotary movement of the upper end of the spring 31 which can rotationally carry the washer or seat 51 with it and hence relative to the bearing element 50. The diaphragm 59 can be long-lasting, transmitting pressure effects to and throughout the large area of the member 58 to which it need not be attached, thus avoiding putting a hole or holes in it for clamping elements, bolts or the like.

The connection between the valve stem 12 and the diaphragm stem 34 is, as to length, adjustable, for purposes of assembly, to more readily compensate for minor or other possible dimensional variations of various of the parts or as may be caused in the course of assembly of various of the other parts, and that adjustability may also be used, if necessary, during subsequent functioning or maintenance, and during initial assembly or setting up of the construction for operation, to make sure that the valve element inside the casing C of the valve V is fully closed and fully opened at the respective extremes of the operational stroke of the diaphragm stem 34; this adjustment, moreover, is operable for both of the above-mentioned types of valve structures within the casing C, that is, for either that type which closes on the upstroke of the valve stem 12 or that type which closes on the downstroke of the valve stem 12.

With the diaphragm stem 34 of fixed length and the pointer arm 36 abutting against the lower end face of the stem 34, and with the valve stem 12 adjustable downwardly or upwardly in relation to both of these parts for purposes such as those just mentioned, there is thereby effected proper setting once and for all of the pointer arm 36 and its pointer 42 in relation to the extreme limits of the indications provided on the plate member 38, and thereby vertical adjustability of the latter can be avoided and, for manufacturing and assembly purposes, the advantage of providing fixed indications on the exterior of the tube-like frame 18 can be achieved.

The pointer arm 36, which is preferably relatively rigid and strong, as indicated in the drawings, and the stem assembly 34—12 have together an operating stroke in either direction adequate to insure complete opening and complete closure of the valve V. In some valve mechanisms, the mechanism is inherently self-limiting of the range of movement of which the valve stem 12 is capable and preferably the vertical length of the slot in the frame is sufficiently in excess of the operating range of the valve stem 12 and pointer arm 36 to insure proper operation by the stem movements of the valve mechanism. Preferably, the inwardly and downwardly projecting portion of the bushing 64 in the cap-like stamping 62, preferably transversely slotted in its underface, as at 64ª, can operate as an ultimate limit to the upward movement of the diaphragm stem 34 with which, as seen in Figure 2, it is in axial alignment.

If the indicia-bearing plate 38 (Figure 3) is reversed end for end, the pointer element 42 which, as shown in Figure 2, is provided with upper and lower horizontal flanges to overly the upper and lower faces of the pointer arm 36 and thus prevent rotational movement, can be easily detached by loosening or removing the screw 41 and then swinging or replacing the pointer element 42 into a position 180° displaced from that shown in Figure 3, so that it points to the right and to the indicia which, upon reversal of the plate 38 end for end, would thus also be brought to the right.

The individual parts may be easily and inexpensively fabricated and I make it possible to employ relatively light sheet metals for certain of them, such as the frame 18 which, to either side of the cut-outs or openings 20 and 21, which are preferably vertically aligned, provides structural elements of curved or accurate cross-section which thus have very substantial rigidity, reinforced and held against distortion out of their curved cross-sectional form by such members as the base plate 23, the annulus 28 and the outwardly flaring and stiffened sheet metal stamping 60 (Figure 2) which, in turn, is strengthened and reinforced by the inherently stiff, because of its cross-section, cap-like stamping 62 and the connection between the two. Assembly in the form of successive sub-assemblies which are subsequently assembled to form the whole is also facilitated; for example, the frame 18 with parts 23 and 28 and 60 may first be constructed as one sub-assembly; the spring 31 may then be seated upon the annulus 28; the stem 34 may then have assembled to it the nut 46, the top plate 53 and the disk element 58, and as a sub-assembly, with the parts 50 and 51 related to the nut 46, then set downwardly into the structure with the lower end of the stem 34 passing through the annulus 28. From that point on, the diaphragm 59 and the cap-like stamping 62 may be put in position, resulting in a unit which may thereafter be readily attached to the valve casing C and the stem 34 and valve stem 12, with interposed pointer arm 36, then connected; or the frame 18 may be connected to the valve casing C and valve stem 12 and pointer 36 connected to the stem 34, and then the diaphragm and top stamping put in place. Thus it will be seen that variation in sequence of steps of assembly are possible to better meet various or varying conditions met with in practice.

Disassembly for repair or replacement of the parts may be easily and quickly effected, as will now be clear.

It will thus be seen that there has been provided in this invention a valve construction in which the various objects above noted together with many thoroughly practical advantages are successfully achieved. The construction will be seen to be compact, light in weight, yet strong and durable, easy to fabricate as to its individual parts and easy to assemble or disassemble and, moreover, the construction is one that is well adapted to meet the varying conditions of hard practical use.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. A valve construction comprising a valve casing and an elongated built-up frame of relatively small transverse dimensions and in open-ended tubular form that comprises sheet metal side frame means of substantial length cross-sectioned for stiffness against bending and having a plurality of longitudinally spaced transverse members secured thereto to hold said side frame means against distortion, at least one of said transverse members being positioned intermediate of the ends of said frame means and being received and positioned internally thereof, one of said transverse members and said valve casing having means for securing them together, said valve casing having bearing means, and another of said transverse members that is remote from said valve casing having bearing means substantially coaxial with said first-mentioned bearing means, stem means slidably supported by said bearing means and extending into said valve casing, helical spring means within said tubular sheet-metal frame means and reacting between one of said transverse members and said stem means, said helical spring means having interposed between at least one end thereof and the part with which said spring end reacts relatively rotatable bearing annuli at least one of which is of low-friction bearing material and both of which are coaxial with the stem means to thereby permit rotational movement of said spring end and prevent transmission of tortional strains of said built-up frame.

2. A valve construction comprising a valve casing and an elongated built-up frame of relatively small transverse dimensions and that comprises sheet-metal side frame means of substantial length cross-sectioned for stiffness against bending and having a plurality of individual longitudinally-spaced transverse annular members interfitted therewith and adapted to hold said side frame means against distortion, at least one of said transverse members being positioned intermediate of the ends of said frame means and being received and positioned internally thereof, said transverse members and said valve casing having means for securing them together, said valve casing having bearing means, and one of said transverse members that is spaced lengthwise of said frame means from said valve casing having bearing means substantially coaxial with said first-mentioned bearing means, stem means slidably supported by said coaxial bearing means, diaphragm means coacting with said stem means, and means including another of said transverse members for supporting said diaphragm and forming therewith a fluid-pressure chamber, in which said last-mentioned means includes a cap-like member engaging an annular portion of the diaphragm to press it against said last-mentioned transverse member, the latter having an internal annular recess, and a split spring ring received in said recess to hold said cap-like member in position and thereby effect clamping of the annular portions of the diaphragm to peripherally seal the fluid-pressure chamber of which the diaphragm forms a part.

3. A valve construction comprising a built-up frame that comprises sheet metal side frame means cross-sectioned for stiffness against bending and having a plurality of longitudinally spaced transverse members secured thereto to hold said side frame means against distortion one or more of said transverse members having bearing means, valve stem means supported in said bearing means, diaphragm means for operating upon said stem means and having a peripheral portion that is thicker than the remaining part of the diaphragm means, said peripheral portion engaging an annular portion of one of said transverse members, and means connected with the latter and forming therewith an annular throat of varying thickness for receiving said peripheral portion and cause the latter to be wedged into increasing sealing relation upon said diaphragm means being stressed in radial direction.

4. A valve construction for assembly to a valve casing or the like comprising a built-up frame comprising a relatively thin-walled tubuluar section of substantial axial length and reinforced by a plurality of individual annular members of which one is inserted internally of said section and fixedly secured thereto intermediate of its length to form a spring abutment, another is secured to said section adjacent its lower end to be received over a part of the valve casing and to have securing means coacting with its internal face and the valve casing to hold the built-up frame assembled to the latter, a side portion of said tubular section being cut away to give access to said securing means, and another of which is positioned adjacent the upper end of said section and has means for attaching it in place upon assembly thereof to the section; a stem extending through said first-mentioned annular member and having a slidable bearing engagement with said third-mentioned annular member, said stem having threaded thereon a capstan nut; a coil spring about said stem interposed between said capstan nut and said first-mentioned annular member; and diaphragm means carried by the upper end of said tubular section for actuating said stem.

5. A valve construction as claimed in claim 4, in which said diaphragm means comprises an annulus secured externally to said tubular section adjacent the upper end thereof, whereby said third annular member is freely receivable axially into the upper end of said tubular section to be secured in position after said spring and stem with the capstan nut are entered into the tubular section, and means including a diaphragm and a closure-casing part secured to said annulus and adapted to form a pressure-responsive chamber to act upon said stem.

6. A valve construction as claimed in claim 4, in which said diaphragm means comprises an annulus secured externally to said tubular section adjacent the upper end thereof, whereby said third annular member is freely receivable axially into the upper end of said tubular section to be secured in position after said spring and stem with the capstan nut are entered into the tubular section, said annulus providing an annular seat for a diaphragm and having a conformation to form one part of readily-connectible securing means; a diaphragm having a peripheral portion seated in said seat; a closure-casing annularly overlying the annular portion of said diaphragm, and means for holding said closure-casing in position to form an annular seal between it and the diaphragm, said means comprising a part that is companion to and coacts with the aforesaid part of said annulus.

5. A valve construction comprising a frame having a plurality of longitudinally-spaced transverse members of which at least one has bearing means aligned substantially coaxially with the frame, valve stem means having support in said bearing means for movement lengthwise of the axis of the stem means, diaphragm means for operating upon said stem means and having an annular peripheral securing portion, said frame having a part presenting an annular seat for said peripheral diaphragm portion, a cap-like member engaging said annular peripheral diaphragm portion to press it against the seat in said part, said part having an internal annular recess, and means comprising a split spring ring received in said recess to hold said cap-like member in position and thereby effect clamping of the annular peripheral diaphragm portion to seal the fluid-pressure chamber formed by the diaphragm and said cap-like member.

FRANCISCO A. QUIROZ.

REFERENCES CITED

The following references are of record in the file of this patent:

UNITED STATES PATENTS

| Number | Name | Date |
|---|---|---|
| 1,801,560 | Knaak | Apr. 21, 1931 |
| 1,934,982 | Jones | Nov. 14, 1933 |
| 2,097,829 | Bassler | Nov. 2, 1837 |
| 2,110,859 | Goehring | Mar. 15, 1938 |
| 2,220,902 | Hastings | Nov. 12, 1940 |
| 2,315,775 | D'Arcey | Apr. 6, 1943 |

Certificate of Correction

Patent No. 2,437,552.                                           March 9, 1948.

FRANCISCO A. QUIROZ

It is hereby certified that error appears in the printed specification of the above numbered patent requiring correction as follows: Column 12, line 25, the claim number "5" should read 7; and that the said Letters Patent should be read with this correction therein that the same may conform to the record of the case in the Patent Office.

Signed and sealed this 11th day of May, A. D. 1948.

[SEAL]

THOMAS F. MURPHY,
*Assistant Commissioner of Patents.*